(12) United States Patent
Bacon et al.

(10) Patent No.: US 8,301,421 B2
(45) Date of Patent: Oct. 30, 2012

(54) AUTOMATIC CONTROL SYSTEM GENERATION FOR ROBOT DESIGN VALIDATION

(75) Inventors: James A. Bacon, Bourbonnais, IL (US); James D. English, Newton, MA (US)

(73) Assignee: Energid Technologies, Cambridge, MA (US)

( * ) Notice: Subject to any disclaimer, the term of this patent is extended or adjusted under 35 U.S.C. 154(b) by 1263 days.

(21) Appl. No.: 11/396,272

(22) Filed: Mar. 31, 2006

(65) Prior Publication Data

US 2007/0233280 A1 Oct. 4, 2007

(51) Int. Cl.
*G06F 11/30* (2006.01)
*G06F 15/00* (2006.01)

(52) U.S. Cl. .............. 703/2; 703/26; 703/22; 703/183; 700/186; 717/135

(58) Field of Classification Search .............. 703/2, 6, 703/22, 24, 26; 700/245, 61, 64, 65, 83–89; 700/186; 345/473; 702/183; 717/135
See application file for complete search history.

(56) References Cited

U.S. PATENT DOCUMENTS

| | | | | |
|---|---|---|---|---|
| 6,088,042 A * | 7/2000 | Handelman et al. | ........... | 345/473 |
| 6,191,798 B1 * | 2/2001 | Handelman et al. | ........... | 345/473 |
| 6,292,715 B1 * | 9/2001 | Rongo | ........................ | 700/249 |
| 6,445,964 B1 * | 9/2002 | White et al. | ................... | 700/61 |
| 6,757,587 B1 * | 6/2004 | English et al. | ............... | 700/245 |
| 2003/0040839 A1 * | 2/2003 | Sabe et al. | .................... | 700/245 |
| 2003/0079207 A1 * | 4/2003 | Xavier et al. | ................. | 717/135 |
| 2006/0004489 A1 * | 1/2006 | Weiss | ............................ | 700/245 |
| 2006/0161300 A1 * | 7/2006 | Gonzalez-Banos et al. | .. | 700/245 |
| 2007/0112461 A1 * | 5/2007 | Zini et al. | ...................... | 700/245 |
| 2007/0208442 A1 * | 9/2007 | Perrone | .......................... | 700/95 |
| 2007/0255454 A1 * | 11/2007 | Dariush | ....................... | 700/245 |

OTHER PUBLICATIONS

*On the Implementation of Velocity Control for Kinematically Redundant Manipulators*, James D. English and Anthony A. Maciejewski, IEEE Transactions on Systems, vol. 30, No. 3, May 2000.
*Review of Pseudoinverse Control for Use with Kinematically Redundant Manipulators*, Charles A. Klein and Ching-Hsiang Huang, IEEE Transactions on Systems, vol. SMC-13, No. 3, Mar./Apr. 1983.
*A Theory of Generalized Inverses Applied to Robotics*, Keith L. Doty, Claudio Melchiorri and Claudio Bonivento, The International Journal of Robotics Research, vol. 12, No. 1, Feb. 1993.
*Task-Space Tracking with Redundant Manipulators*, Olav Egeland, IEEE Journal of Robotics and Automation, vol. RA-3, No. 5, Oct. 1987.
*Configuration Control of Redundant Manipulators: Theory and Implementation*, Homayoun Seraji, IEEE Transactions on Robotics and Automation, vol. 5, No. 4, Aug. 1989.

(Continued)

*Primary Examiner* — Thai Phan
(74) *Attorney, Agent, or Firm* — Holland & Knight LLP; Brian J. Colandreo, Esq.; Mark H. Whittenberger, Esq.

(57) ABSTRACT

The specification and drawings present a new method, system and software product for and apparatus for generating a robotic validation system for a robot design. The robotic validation system for the robot design of a robotic system is automatically generated by converting a robot design into a generic robotic description using a predetermined format, then generating a control system from the generic robotic description and finally updating robot design parameters of the robotic system with an analysis tool using both the generic robot description and the control system.

25 Claims, 8 Drawing Sheets

OTHER PUBLICATIONS

*Kinematic Programming Alternatives for Redundant Manipulators*, John Baillieul, IEEE, 1985.

*Improved Configuration Control for Redundant Robots*, H. Seraji and R. Colbaugh, Journal of Robotic Systems 7 (6), 897-928 (1990).

*Optimal Rate Allocation in Kinematically Redundant Manipulators—The Dual Projection Method*, Ming. Z. Huang and Hareendra Varma, Proceedings of the 1991 IEEE, Intl. Conference on Robotics and Automation, Sacramento, California, Apr. 1991.

*Efficient Gradient Projection Optimization for Manipulators with Multiple Degrees of Redundancy*, H. Zghal, R.V. Dubey and J. A. Euler, IEEE 1990.

*Numerical Integration and Digital-Model Updates in the AIM-9X Simulation*, James D. English and James A. Bacon.

*Efficient Dynamic Computer Simulation of Robotic Mechanisms*, M. W. Walker and D. E. Orin, Journal of Dynamic Systems, Measurement, and Control, Sep. 1982, vol. 104, pp. 205-211.

*An efficient Algorithm for Computation of Manipulator Inertia Matrix*, Amir Fijany and Antal K. Bejczy, Journal of Robotic Systems, 7(1), 57-80 (1990).

Robot *Dynamics Algorithms*, Roy Featherstone, 1987.

Robot *Dymanics: Equations and Algorithms*, Roy Featherstone and David Orin.

*Automatic Design and Manufacture of Robotic Lifeforms*, Hod Lipson and Jordan B. Pollack, Nature, vol. 406, Aug. 31, 2000, www.nature.com.

*Multicore, Dual-core, and the Future of Intel ars Technica*, Monday, Sep. 13, 2004.

*Sony, Partners Offer Glimpse of New "Cell" Chip*, Mark Hachman, Nov. 29, 2004, http://www.extremetech.com.

*NEC Develops Multicore Cell Phone Processor*, by Martyn Williams, Mar. 27, 2006, http://www.computerworld.com.

A *Simplex Method for Function Minimization*, J. A. Nelder and R. Mead, p. 308-313.

*Downhill Simplex Method in Multidimensions*, Numerical Recipes in C, The Art of Scientific Computing, William H. Press, Brian P. Flannery, Saul A. Teukolsky and William T. Vetterling, Chapter 10.4.

*The IP Network Address Translator*, K. Egevang, P. Francis, Network Working Group, 1631, May 1994.

*STUN, Simple Traversal of User Datagram Protocol (UDP) Through Network Address Translators (NATs)*, J. Rosenberg, J. Weinberger, et al, Network Working Group, 3489, Mar. 2003.

*Tea, a Tiny Encryption Algorithm*, David J. Wheeler, Roger M. Needham, Cambridge University, England.

*Tea Extensions*, Robert M. Needham and David J. Wheeler, Oct. 1996.

*Introduction to Robotics Mechanics and Control*, John J. Craig, Chapter 2, p. 19-31.

*Modeling and Control of Elastic Joint Robots*, M. W. Spong, Journal of Dynamic Systems, Measurement and Control, Dec. 1987. vol. 109.

*Modeling and Identification of a Class of Servomechanism Systems With Stick-Slip Friction*, Ka C. Cheok, Hongxing Hu, Nan K. Loh, Journal of Dynamic Systems, Measurement and Control Sep. 1988, vol. 110.

*Animating Sand, Mud, and Snow*, Robert W. Sumner, James F. O'Brien and Jessica K. Hodgins, Computer Graphics Forum, vol. 18, (1999).

*Modeling Soil: Realtime Dynamic Models for Soil Slippage and Manipultaion*, Xin Li and J. Michael Moshell, Institute for Simulation and Training, University of Central Florida.

*A Simulation System for Behaviour Evaluation of Off-Road Mobile Robots*, C. Grand, F. Ben Amar and P. Bidaud, G. Andrade, Proceedings of the CLAWAR 2001 conference.

*Virtual Actuator Control*, Jerry Pratt, Ann Torres, Peter Dilworth, Gill Pratt, IEEE 1996.

*Legged Robots That Balance*, Marc H. Raibert, Chapter 1, p. 1-27.

*Accelerating the Design Cycle in a Converging World*, Mihir Ravel, ED Online ID #1767, Feb. 2, 2004.

Bretl et al. "Free-Climbing with a Multi-Use Robot," Proceedings of the International Symposium on Experimental Robotics (ISER), Singapore, Jun. 2004, pp. 1-10.

Doty et al. "Robot manipulability," IEEE Transactions on Robotics and Automation, Jun. 1995, Machine Intelligence Lab., Florida Univ., Gainesville, FL, vol. 11, Issue 3, pp. 462-468.

\* cited by examiner

Radius of Influence Method

Figure 11b

AUTOMATIC CONTROL SYSTEM GENERATION FOR ROBOT DESIGN VALIDATION

STATEMENT REGARDING FEDERALLY SPONSORED RESEARCH AND DEVELOPMENT

The invention was supported by NASA under contracts NNC05CA77C and NNC06CA27C. The U.S. Government has certain rights in the invention.

FIELD OF THE INVENTION

The invention generally relates to robotics and more specifically to generating a robotic validation system for a robot design.

BACKGROUND ART

Many good CAD (computer-aided design) software packages support design, such as SOLID WORKS, UG NX, and PRO/ENGINEER. Also many good packages provide analysis, such as WORKSPACE5, DARVIM 2K, and ADAMS. Yet design and analysis packages rarely work together well to meet the specific needs of robot designers. For maximum efficiency, a robot designer might want to modify a hardware design and test it in software 10-20 times in a workday. Yet modifying a robot design on one software package, then converting and validating it on another can take days of effort, and when finished, the designer may not have access to the information really needed for robot analysis, such as control torques and sensor data. This inefficiency is expensive and time consuming, and it is detrimental to the quality of robot designs.

New ways for connecting the existing well-solved pieces of the robot design cycle as well as new robot-specific analysis are needed. Constructing a part in a CAD program is largely solved. Simulating rigid-body dynamics with differential equations is largely solved. A challenge lies in connecting these and other components and integrating human input in an efficient way.

Another challenge lies in adding all the capability needed by roboticists. Most commercial packages are not tailored to robotics. To make a complete product that will find wide acceptance and use, new algorithms and software should support robotic workspace, control, manipulation, sensor, actuator, and locomotion analysis. The human interface should provide robotics-tailored data, described using robotic terminology. A new software framework that integrates commercial capability where available and adds new capability where needed may change the nature of development for the entire robotics field.

DISCLOSURE OF THE INVENTION

According to a first aspect of the invention, a method for generating a validation system to validate a robot design of a robotic system, comprises the steps of: automatically converting a robot design into a generic robotic description using a predetermined format; automatically generating a control system from the generic robotic description; and updating robot design parameters of the robotic system with an analysis tool using the generic robot description and the control system.

According further to the first aspect of the invention, the updating of robot design parameters may be automatic.

Further according to the first aspect of the invention, the robot design may be loaded from robot design software.

Still further according to the first aspect of the invention, the robot design may comprise at least one of: a) a hardware design, b) an electronic design, and b) surface properties.

According further to the first aspect of the invention, the analysis tool may provide a simulation and the simulation may be at least one of: a) a kinematic simulation, b) a dynamic simulation, c) a terrain simulation.

According still further to the first aspect of the invention, the predetermined format may be at least one of: a) an extensible markup language (XML), and b) a text based format.

According further still to the first aspect of the invention, the robotic description may comprise at least one of: a) a model of the environment, and b) sensor models.

According yet further still to the first aspect of the invention, the control system may comprise at least one of: a) a kinematic component, b) a dynamic component, c) an adaptation feature for avoiding self-collisions and collisions with the environment, and d) an adaptation feature to control deforming links and avoid collisions with the deforming links.

Yet still further according to the first aspect of the invention, the robotic system may comprise at least one feature out of: a) one or more articulated manipulators with one or more rigid or deforming links having a fixed base, b) one or more articulated mobile mechanisms with one or more rigid or deforming links, c) a bifurcating kinematic structure, and d) a closed kinematic structure.

Still yet further according to the first aspect of the invention, the generating the robotic validation may be provided using at least one of: a) network communications, and b) network communications over Internet.

Still further still according to the first aspect of the invention, the robotic system may be controlled using at least one of: a) network communications; and b) network communications over Internet.

According further still to the first aspect of the invention, the control system may be established using at least one of: a) network communications; and b) network communications over Internet.

According yet further still to the first aspect of the invention, the robotic system may be used for at least one application out of: a) space applications, b) military applications, c) agricultural applications, d) medical applications, e) domestic applications, f) mining applications, and g) agricultural applications.

According still yet further still to the first aspect of the invention, the updating robot design parameters may comprise calculating updated robotic parameters by the analysis tool using at least one of: a) Monte Carlo analysis, b) parametric analysis, and c) parameter-optimization analysis. Further, the updating robot design parameters may comprise using automatically the updated robotic parameters calculated by the analysis tool to improve the design of the robotic system by the design tool. Still further, the updated robotic parameters may be provided to a design tool for improving the design of the robotic system by the design tool.

Yet still further according to the first aspect of the invention, the general robotic description may comprise at least one of the following features: a) shapes, b) links, c) manipulators, d) stated systems, e) mechanisms with generic joint articulation comprising sliding, rotational, elliptical, or spherical articulations, and f) automatic simplification of the hardware design comprising physical dimensions, surface properties, kinematics properties or dynamics properties.

Still yet further according to the first aspect of the invention, the control system may use Jacobian-based algorithm. Further, the control system may use a velocity control framework using the following algorithm:

$$V = J(q)\dot{q}^*, \quad (1)$$

wherein V is an m-length vector representing a motion of end effectors; q is a vector of joint positions, $\dot{q}^*$ is an n-length vector formed by augmenting a derivative vector $\dot{q}$ with linear and angular velocities of a base link of the robotic system; and J is an m×n Jacobian as a function of q, wherein $$\dot{q}^* = \begin{bmatrix} J \\ N_J^T W \end{bmatrix}^{-1} \begin{bmatrix} V \\ -\alpha N_J^T F \end{bmatrix}.$$

wherein $N_J$ is an n×(n−m) set of vectors that spans a null space of J, α is a scalar, W(q) is a matrix function, and F(q) is a vector function.

According to a second aspect of the invention, a computer program product comprising: a computer readable storage structure embodying computer program code thereon for execution by a computer processor with the computer program code, characterized in that it includes instructions for performing the steps of the first aspect of the invention, indicated as being performed by any component of the validation system.

According to a third aspect of the invention, a robotic validation system for a robot design of a robotic system performed automatically, comprises: a design software interpreter, for converting the robot design into a generic robotic description using a predetermined format, and for generating a control system from the generic robotic description; and an analysis tool, for updating robot design parameters of the robotic system using the generic robot description and the control system.

According further to the third aspect of the invention, the design software interpreter may be a client node of a network.

Further according to the third aspect of the invention, the robotic validation system may comprise an analysis software interpreter, for converting the generic robotic description to a native format of the analysis tool. Further, the analysis software interpreter may be a client node of a network.

Still further according to the third aspect of the invention, the robotic validation system may comprise a design tool, for reading a file describing the robot design in a native format for converting the robot design to the generic robotic description using the predetermined format. Further, the robotic validation system may comprise a Post-processing tool, for writing results of the updating robot design parameters to improve the design of the robotic system by the design tool.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new method, system and computer program are presented for generating a robotic validation system for a robot design. According to an embodiment of the present invention, the validation system for a robot design (of a robotic system) is automatically generated by converting a robot design into a generic robotic description using a predetermined format, then generating a control system from the generic robotic description and finally updating robot design parameters of the robotic system with an analysis tool using both the generic robot description and the control system. There are many variation and implementation options according to embodiments of the present invention. These embodiments are provided below.

The robot design can be loaded, e.g., from robot design software. The robot design can comprise hardware design, electronic design, and/or surface properties. Surface properties can be defined by an appearance and/or mechanical properties of the surfaces. For example, surface properties can be (but are not limited to) any generic information like color, transparency, shininess, spring constant for defining stiffness, hardness, flexibility, fragility, friction properties, etc. The robotic description can comprise (but is not limited to) a model of the environment and/or sensor models (e.g., for providing a force feedback to assist with grasping objects), such as touch sensors, force sensors, joint encoders, accelerometers, gyroscopic sensors, color cameras, gray-level cameras, ladar, or hyperspectral sensors.

The robotic system can be used (but is not limited to): space applications, military applications, agricultural applications, domestic applications, mining applications, medical applications, etc. The robotic system can comprise the following features:
 a) one or more articulated manipulators with one or more rigid (in general, links can be perfectly rigid, i.e., no bending, growing, shrinking, etc.) or deforming links (deforming links, designed to change shape in a controllable way, are not rigid bodies and typically have more degrees of freedom than rigid bodies, e.g., more than 6 degrees of freedom;) having a fixed base (fixed based robots are often seen in manufacturing wherein, e.g., an arm is attached to a fixed base which cannot move, whereas mobile robots may be on mobile platforms often on wheels, legs, or tracks);
 b) one or more articulated mobile mechanisms with one or more rigid or deforming links, and/or
 c) a bifurcating kinematic structure.

The general robotic description can comprise (but is not limited to) the following features: shapes, links, manipulators, stated systems, mechanisms with generic joint articulation comprising sliding, rotational, elliptical, or spherical articulations, and/or automatic simplification of the hardware design comprising physical dimensions, surface properties, kinematics properties or dynamics properties.

The control system can be automatically generated from the robotic description. The control system can comprise (but may not be limited to): a kinematic component, a dynamic component, an adaptation feature for avoiding self-collisions and collisions with the environment, and an adaptation feature to control deforming links and provide collision avoidance with deforming links.

The predetermined format may be generally text based and can use, e.g., an extensible markup language (XML). The network communications (e.g., over Internet) can be used for generating the robotic validation, for controlling the robotic system, and/or for establishing the control system.

The analysis tool can provide a simulation which can (but is not limited to) kinematic simulation, dynamic simulation, and/or terrain simulation. The updating of robot design parameters can comprise calculating updated robotic parameters by the analysis tool using (but not be limited to) the following methods: Monte Carlo analysis, parametric analysis, and/or parameter optimization control. The updating of robot design parameters can comprise using automatically the updated robotic parameters calculated by the analysis tool to improve the design of the robotic system by the design tool. The updated robotic parameters can be provided to a design tool for improving the design of the robotic system by the design tool.

Figure 1:
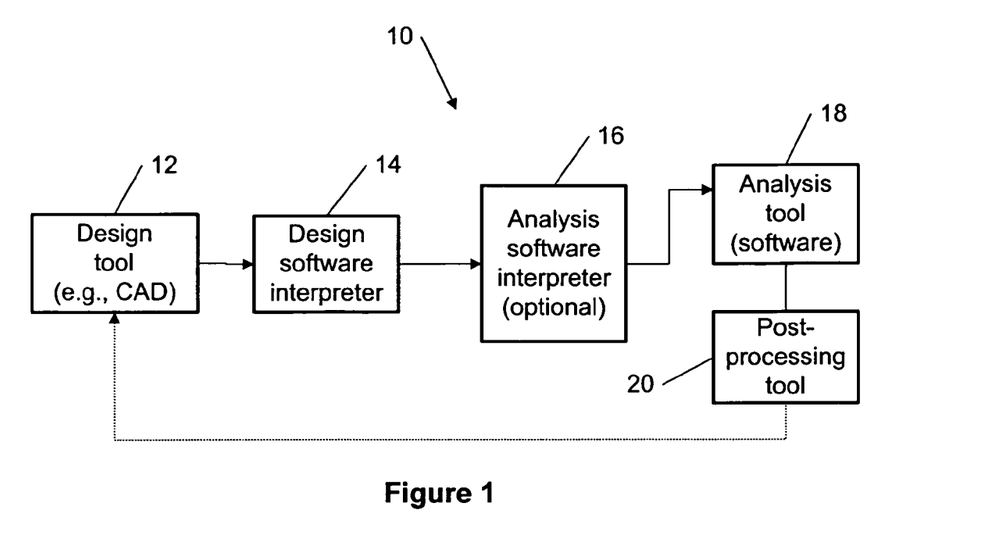
FIG. 1 is a block diagram of a robotic validation system for a robot design, according to an embodiment of the present invention.

FIG. 1 is an example among others of a block diagram of a simplified robotic validation system 10 for a robot design, according to an embodiment of the present invention. The example of FIG. 1 can be implemented, e.g., on one computer. The design tool 12 can be CAD software represented, e.g., in SOLID WORKS. The CAD software (the block 12) reads a file describing a robot design in its proprietary format.

In response to an appropriate command from the user, the design software interpreter 14 converts the file describing a robot design (e.g., a CAD hardware design) into a specific robotic description using a predetermined format, e.g., extensible markup language (XML). Typically, the design software interpreter 14 is plugged into the CAD software at load time (e.g., component object model (COM) or dynamic link library (DLL) linking can be used to accomplish this integration). Because it is plugged in at run-time, the interpreter 14 can use the calling methods of the design tool 12 (e.g., the CAD software) to get the hardware design. Along with the specific robotic description (e.g., an XML file with a conversion of the CAD hardware design), a new control system (also, e.g., in the XML) for controlling the robot and appropriate for the robot design is created by the interpreter 14. The user can also specify the type of analysis/simulation (e.g., the parameter optimization, Monte Carlo simulation, parameter optimization study, kinematic simulation, dynamic simulation, and/or dynamic simulation, etc.) to be performed, typically after being prompted by the interpreter 14.

Moreover, if the analysis tool 18 cannot read the predetermined format (e.g., XML) directly, an analysis software interpreter 16 converts the generic robotic description (e.g., in XML) to its native format. The analysis tool 18 then performs the analysis specified by the user with the results being fed back to the design tool 12 (e.g., using the interpreter 14). Alternatively, the analysis tool 18 can write out results to the native format of a post-processing tool 20. Then the post-processing tool 20 writes results in the XML which can be read by the design software interpreter 14 subsequently updating the CAD model of the robot design by using the calling methods of the design tool 12.

Figure 2:
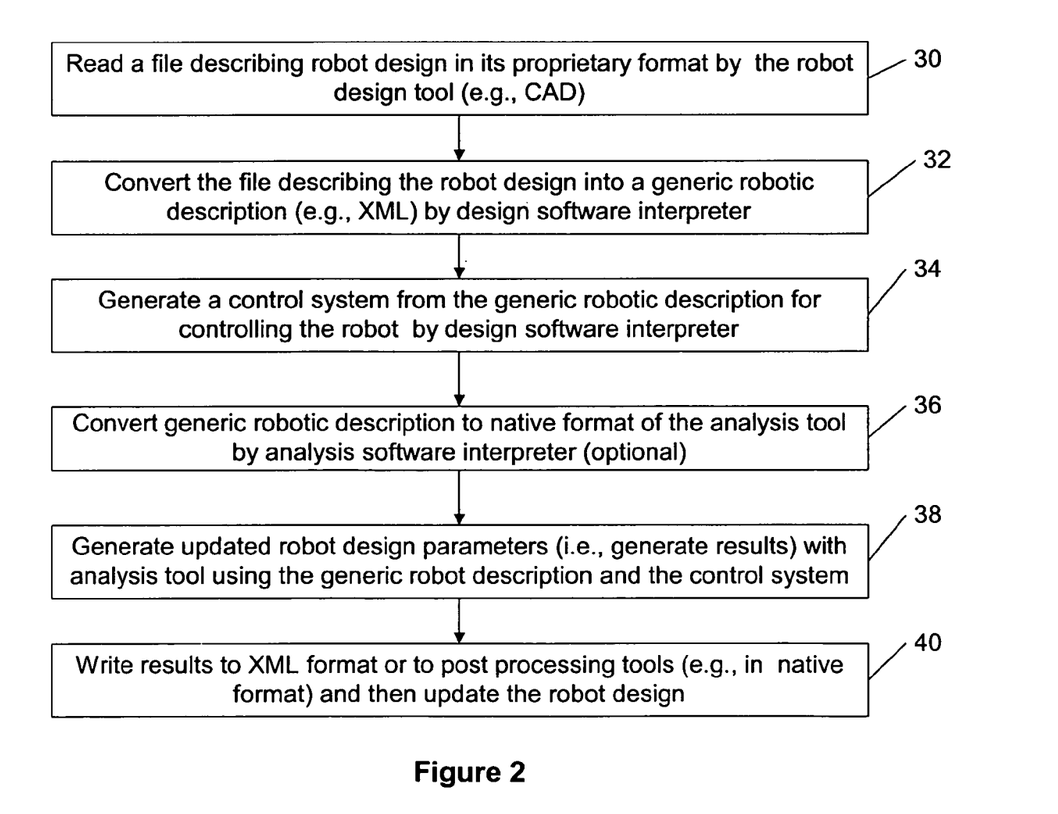
FIG. 2 is a flow chart of a robotic validation system for a robot design, according to an embodiment of the present invention.

FIG. 2 is a flow chart of a robotic validation system 10 for a robot design, according to an embodiment of the present invention. The flow chart of FIG. 2 only represents one possible scenario among others. In a method according to the first embodiment of the present invention, in a first step 30, the robot design tool (e.g., CAD) 12 reads the file describing the robot design of the robotic system in its proprietary format. In a next step 32, the design software interpreter 14 converts the file describing the robot design into a generic robotic description (e.g., XML). In a next step 34, subsequently, the design software interpreter 14 also generates a control system from the generic robotic description for controlling the robot (e.g., also in XML).

Moreover, in a next step 36, the analysis software interpreter 16, if necessary, converts the generic robotic description to a native format of the analysis tool 18. In a next step 38, the analysis tool 18 generates updated robot design parameters (i.e., generates results) using the generic robot description and the control system provided by the design software interpreter 14. Finally, in a next step 40, results generated by analysis tool 18 are written to the XML format or to a post processing tool (e.g., in the native format) subsequently updating the CAD model of the robot design by the design tool 12.

Figure 3:
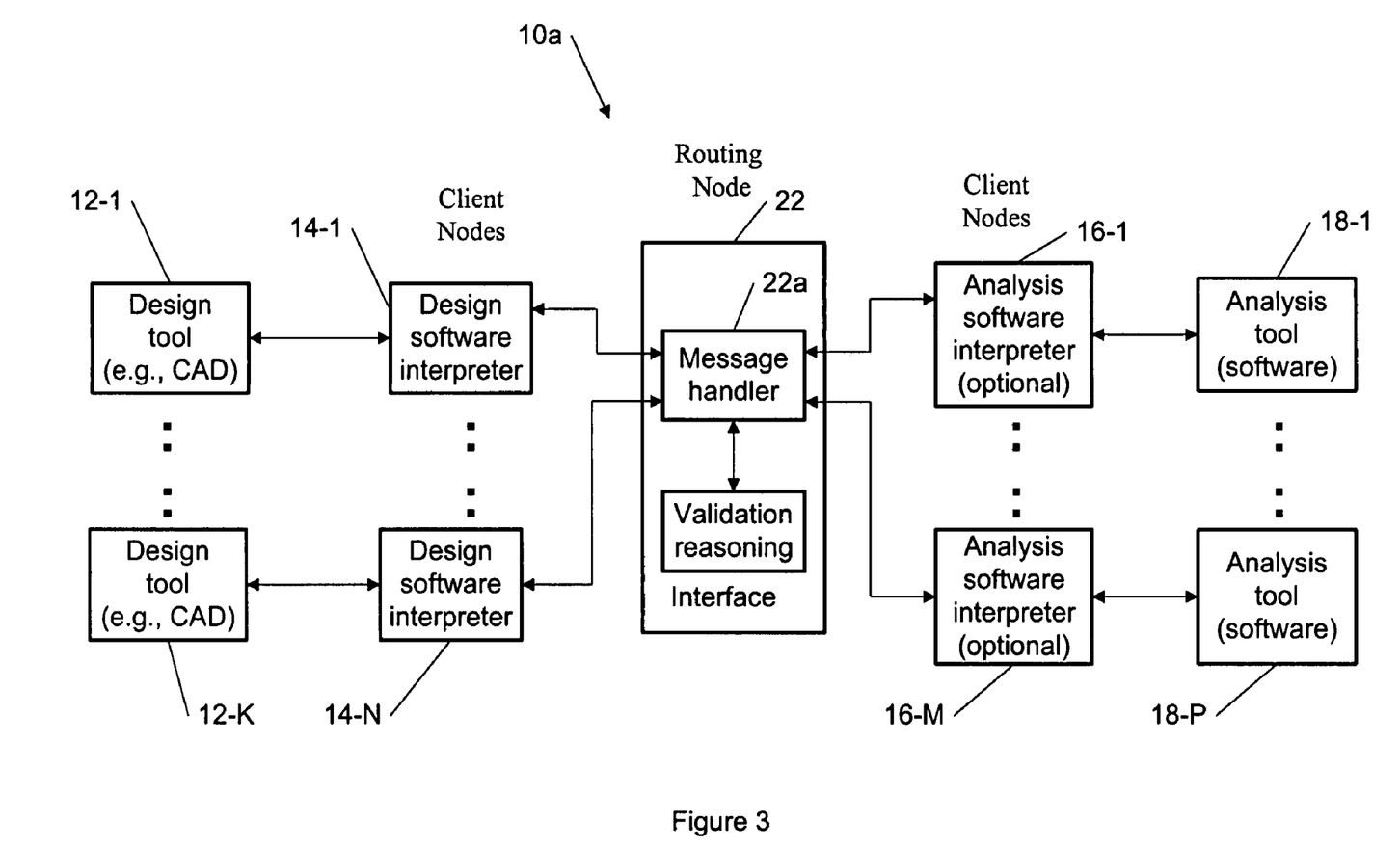
FIG. 3 is a block diagram of a robotic validation system for a robot design for multiple client nodes using network connections, according to an embodiment of the present invention.

FIG. 3 shows an example among others of a robotic validation system 10a for a robot design for multiple client nodes using network connections, according to an embodiment of the present invention. The robotic validation system 10a (or the design-and-validation system) is organized using client and routing nodes that exchange information on robot design and analysis results over networked or direct connections. There are two possible groups of client nodes. One group can comprise N design software interpreters 14-1, 14-2, . . . , 14-N. Each of these interpreters 14-1, 14-2, . . . , 14-N has similar functionality as the block 14 of FIG. 1. Another (optional) node group can comprise M analysis software interpreters 16-1, 16-2, . . . , 16-M. Each of these interpreters 16-1, 16-2, . . . , 16-M has similar functionality as the block 16 in FIG. 1. The routing node (interface) 22 has a message handler 22a which provides a network communication (e.g., through the Internet) between any of the client nodes 14-1, 14-2, . . . 14-N and any of the client nodes 16-1, 16-2, . . . , 16-M. The validation reasoning block may represent software that ensures the validity of all exchanged messages, using, e.g., an XML schema. The system 10a can have K design tools 12-1, 12-2, . . . , 12-K (e.g., installed on K network computers) and P analysis tools 18-1, 18-2, . . . , 18-P (e.g., installed on P network computers), wherein each of these blocks has the same functionally as blocks 12 and 18, respectively, in FIG. 1. Each of the K design tools 12-1, 12-2, . . . , 12-K can use services of any or pre-selected design software interpreters from the N design software interpreters 14-1, 14-2, . . . , 14-N for translating to/from the predetermined format (e.g., XML). Similarly, each of the P analysis tools 18-1, 18-2, . . . , 18-K can use services of any or pre-selected design software interpreters from the M analysis software interpreters 16-1, 16-2, . . . , 16-N for translating to/from the predetermined format (e.g., XML). It is noted that K, N, M and P are integers, which can have different values or a combination thereof can have the same values.

Direct interfaces to design and validation software is made through client nodes, and connections between design and validation software is made through routing nodes. When the nodes are parts of a single application, the communication will typically be through a direct exchange of information in memory. However, when the nodes are parts of the network, the communication will be, e.g., through the XML over TCP/IP (transport control protocol/internet protocol) as illustrated in FIG. 3.

The performance of the system 10a is similar to the performance of a simple system shown in FIG. 1. For example, the design software interpreter 14-1 takes the hardware design as contained in the CAD design software (i.e., the design tool 12-1) and converts it to the generic robotic description with a control system. The user can also specify the form of analysis to apply to the conversion (e.g., Monte Carlo simulation or other methods according to embodiments of the present invention). The routing node 22 automatically sends the data in the form of, e.g., XML to the computer with the analysis tool 18-1. If needed, the analysis software interpreter 16-1 converts the XML to the format required by the analysis tool 18-1. The analysis tool 18-1 performs the simulation and sends results back to the CAD design software for updating the CAD model of the robot design by the design tool 12-1.

Information passed from the design tool (e.g., 12, 12-1, 12-2, . . . , or 12-K) to the analysis tool (e.g., 18, 12-8, 12-8, . . . , or 18-P) can be (but is not limited to): 1) a description only of the system, with the type of analysis left up to the analysis tool or 2) both a system and a request for a specific type of analysis. The potential forms of the data transmitted from the design to the analysis tool are given in Table I below.

TABLE 1

| Data Form | Description |
| --- | --- |
| Shape | Any shape, including sphere, ellipsoid, capsule, polyhedron, and so forth. |
| Link | A single link in a robotic mechanism, which includes the shape, kinematics, mass properties, and actuator properties. |
| Manipulator | A single robot, which includes any number of connected links. |
| Stated System | Any number of robots and their states. |
| Kinematic | A simulation of a stated system, which includes |

TABLE 1-continued

| Data Form | Description |
| --- | --- |
| Simulation | a stated system, visualization properties, and a kinematic control system. |
| Dynamic Simulation | A simulation providing all the capability of a kinematic simulation, but with dynamic simulation of articulation, physical impacts, and motor control. |
| Parametric Study | A study that changes parameters in fixed steps and tabulates outcomes. |
| Monte Carlo Study | A study that randomly varies parameters and tabulates simulation outcomes. |
| Parameter Optimization Study | A study that finds parameters that optimize a specified function of simulation outcomes. |

Figure 4A:
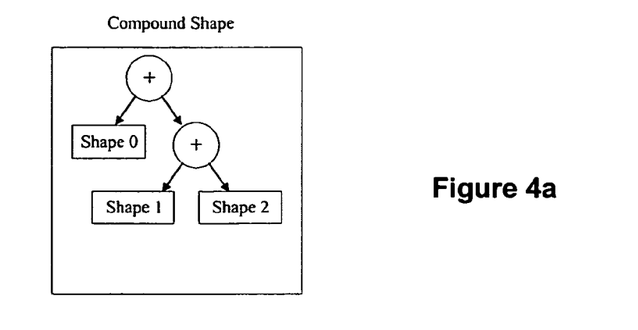
FIG. 4a is a block diagram representing a tree structure for robot link's physical extent, according to an embodiment of the present invention.
Figure 4B:
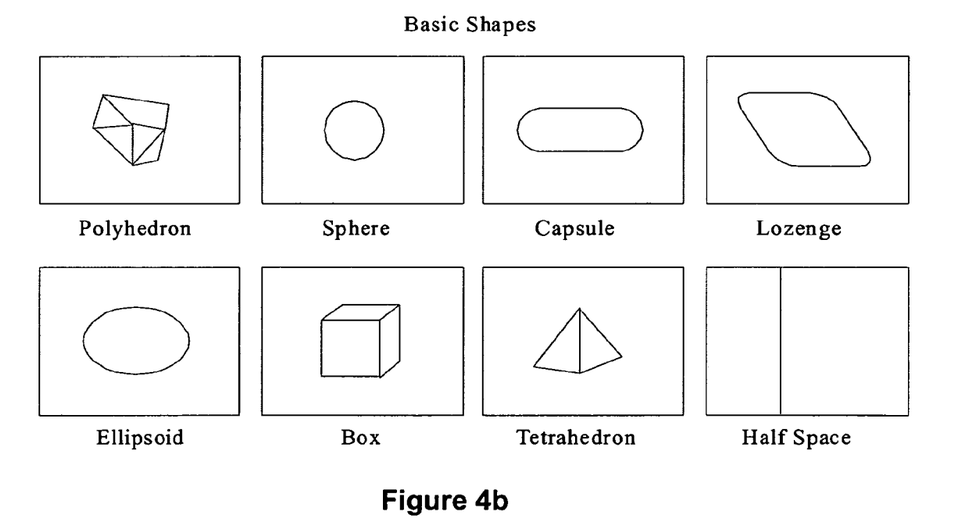
FIG. 4b are pictures of basic shapes which can be applied, according to embodiments of the present invention.

According to an embodiment of the present invention, a physical extent can be represented as a combination of geometric primitives through a tree structure shown in FIG. 4a. This tree structure is used to represent a robot link's physical extent. Internal nodes can be unions or intersections, and the leaves are basic shapes. The most common shape is the polyhedron. Other basic shapes provide a simpler representation for some applications and serve as bounding volumes to speed up calculations. The tree structure is composable at runtime, and can be easily modified (either directly or through the DLL) to support new geometric shape primitives or branching nodes. The leaves in the tree are shape primitives, some examples of which are shown in FIG. 4b.

Figure 4C:
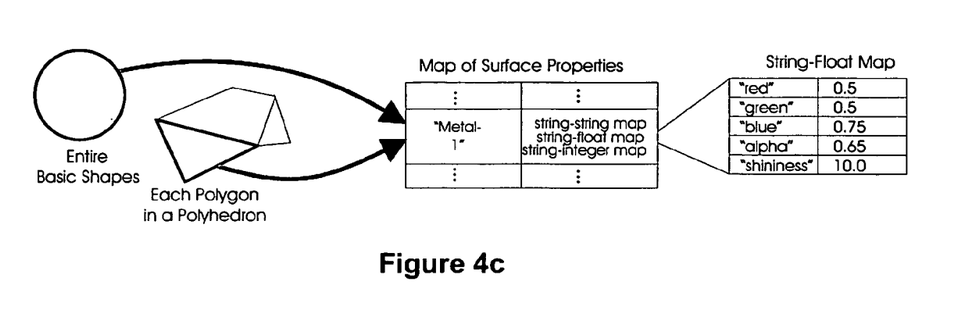
FIG. 4c is a schematic representation of a string-to-surface-property map, according to an embodiment of the present invention.

For rendering, simulation, and reasoning, every shape uses surface properties referenced by string tokens. Polyhedrons organize their polygons by surface property. This is illustrated in FIG. 4c. Each shape (shown in FIG. 4b) uses a string-to-surface-property map. Each surface property in turn maintains string-entity maps, including string-string, string-float, and string-integer maps. These are configurable through the XML. They can represent virtually any property, including appearance, hardness, flexibility, fragility, and friction properties.

Figure 5:
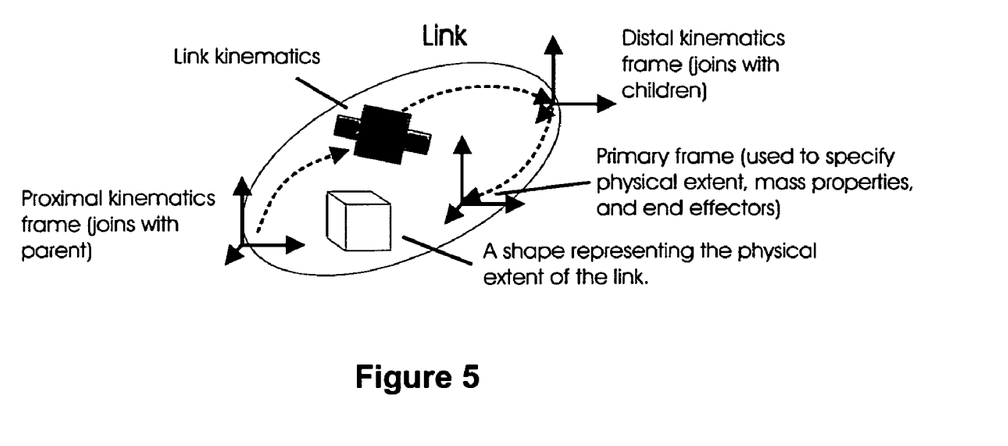
FIG. 5 is a schematic representation of a link for constructing a robotic description, according to an embodiment of the present invention.

According to an embodiment of the present invention, the link is the fundamental object used to construct robot descriptions. Each link corresponds to a single robotic joint. The distal frame of one link is rigidly attached to the proximal frame of each child link in the kinematic structure. This allows multiple formalisms such as, e.g., Paul or Craig's Denavit-Hartenberg (D-H) notation, and it supports the representation of new types of joints. Each link object, as illustrated in FIG. 5 also holds mass properties, actuation parameters, the physical extent of the link, surface properties descriptions, and joint-limit dynamics (which is of the form shown in FIG. 3b). In the FIG. 5 representing a link, the proximal D-H frame is rigidly attached to the parent. The distal D-H frame aligns with the proximal D-H frame of child links.

The link's mass properties can include, e.g., up to 10 unique scalars needed for rigid-body dynamics calculations. These scalars represent, for example, the mass, center of mass, and second moment of inertia. The actuator parameters can include (but are not limited to) the motor friction, motor inertia, gear ratio, and joint limits. Joint-limit dynamics are represented using a repulsive force or torque that is proportional to the incursion into a specified zone defining the hard stop.

Figure 6:
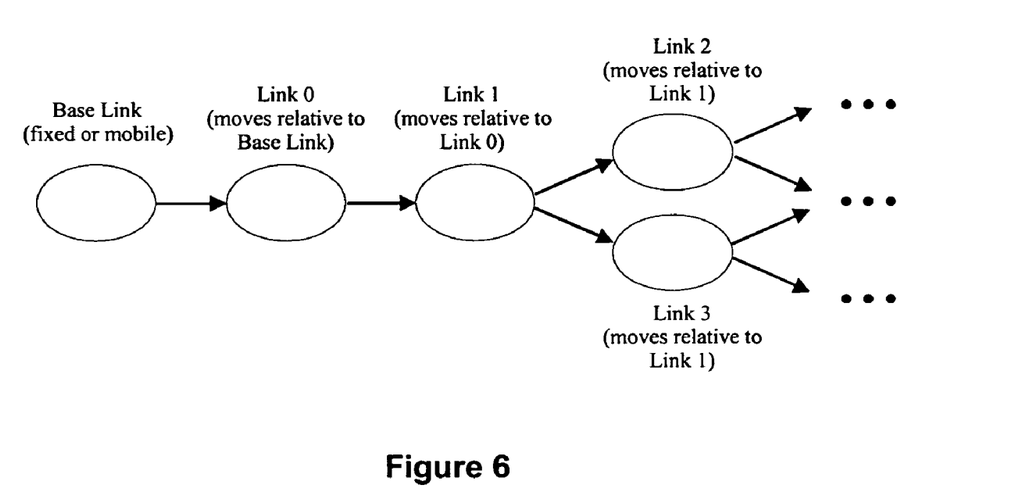
FIG. 6 is a schematic representation of a manipulator constructed by connecting links in a tree structure, according to an embodiment of the present invention.

According to an embodiment of the present invention, a manipulator or robot is constructed by connecting links in a tree structure, as shown in FIG. 6. The structure supports any number of links and any number of bifurcations, such as those present on LEMUR (legged excursion mechanical utility rover, see, e.g., T. Bretl, S. Rock, J.-C. Latombe, B. Kennedy, and H. Aghazarian, "Free-Climbing with a Multi-Use Robot, "*Proceedings of the* 2004 *International Symposium on Experimental Robotics*, Singapore, June 2004). One link serves as the base and its position and orientation are specified explicitly. In FIG. 6, a manipulator, or robotic mechanism, is defined through a link tree. Each individual link has the form shown in FIG. 5 and moves relative to its parent. The state of the robot includes the position and orientation of the base link and a joint value for all the other links.

The unique robotic control techniques, according to an embodiment of the present invention, form a core component of a kinematic simulation, which includes a stated system, as described above combined with a configurable control system comprised of a velocity control system and a position control system. The control system is robust enough to be generated automatically, yet flexible enough to give the designer full control over behavior when desired. Velocity and position controls are described below.

The core velocity-control framework is based on the Jacobian equation:

$$V = J(q)\dot{q}^*, \qquad (1),$$

wherein V is an m-length vector representation of the motion of the end effectors (for example, linear and angular velocities referenced to points rigidly attached to parts of the robot); q is the vector of joint positions, $\dot{q}^*$ is the n-length vector formed by augmenting $\dot{q}$ with the linear and angular velocity of the base link; and J is the m×n Jacobian, a function of q. When the robotic mechanism is kinematically redundant, the dimension of V is less than the dimension of q (m<n), and Equation 1 is under constrained when V is specified. By using V to represent motion of one link relative to another, Equation 1 can support self-connecting mechanisms.

The control framework calculates joint rates and base motion $\dot{q}^*$ that best achieve a desired set of end-effector motions, V, by building on the method described in "On the Implementation of Velocity Control for Kinematically Redundant Manipulators," J. D. English and A. A. Maciejewski, *IEEE Trans. on Sys., Man, and Cybernetics—Part A: Systems and Humans*, vol. 30, no. 3, May 2000, pp. 233-237, which uses a scalar $\alpha$, a matrix function W(q), and a vector function F(q) to solve for $\dot{q}^*$ as follows:

$$\dot{q}^* = \begin{bmatrix} J \\ N_J^T W \end{bmatrix}^{-1} \begin{bmatrix} V \\ -\alpha N_J^T F \end{bmatrix}. \qquad (2)$$

wherein $N_J$ is an n×(n−m) set of vectors that spans the null space of J. That is, $JN_J=0$, and $N_J$ has rank (n−m). $N_J$ is generally a function of q. By just changing the values of $\alpha$, W, and F(q), many new and most established velocity-control techniques can be implemented, including pseudoinverse control (e.g., see "Review of Pseudoinverse Control for Use with Kinematically Redundant Manipulators," C. A. Klein and C. H. Huang, IEEE Trans. on *Sys., Man, and Cybernetics*, vol. SMC-13, pp. 245-250, March/April 1983), weighted pseudoinverse control (e.g., see "Robot Manipulability," K. L. Doty, C. Melchiorri, E. M. Schwartz, and C. Bonivento, *IEEE J. Robot. Automat.*, vol. 11, pp. 462-468, June 1995), augmented Jacobian techniques (e.g., see "Task Space Tracking with Redundant Manipulators," O. Egeland, *IEEE J. Robot. Automat.*, vol. RA-3, pp. 471-475, October 1987 and "Configuration Control of Redundant Manipulators: Theory and Implementation," H. Seraji, *IEEE Trans. Robot. Automat.*, vol. 5, pp. 472-490, August 1989), extended Jacobian techniques (e.g., see "Kinematic Programming Alternatives for Redundant Manipulators," J. Baillieul, *Proc.* 1985 *IEEE Int. Conf. Robot. Automat.*, St. Louis, Mo., Mar. 25-28, 1985, pp. 722-728 and "Improved Configuration Control for Redundant Robots," H. Seraji and R. Colbaugh, *J. Robot. Syst.*, vol. 7, no. 6, pp. 897-928, 1990), and projection methods (e.g., see "Optimal Rate Allocation in Kinematically Redundant Manipulators—The Dual Projection Method," M. Z. Huang and H. Varma, *Proc.* 1991 *IEEE Int. Conf Robot. and Automat.*, Philadelphia, Pa., Apr. 24-29, 1988, pp. 28-36 and "An Efficient Gradient Projection Optimization for Manipulators with Multiple Degrees of Redundancy," H. Zghal, R. V. Dubey, and J. A. Euler, Proc. IEEE 1990 Int. Conf. Robot. and Automat., Cincinnati, Ohio, May 13-18, 1990, pp. 1006-1011). These techniques can be used to optimize criteria such as balance, collision avoidance, joint-limit avoidance, and strength optimization.

V represents the motion of all the robot's end effectors concatenated into a single column. Many types of end effectors are supported, such as point constraints, frame constraints, joint angle constraints, and center-of-mass constraints. Any number of these different types can be used to define V. It is possible to exchange end-effector descriptions, and thereby change the definition of V, at runtime.

The control system is organized into an XML-described tree structure that can formally represent the complexity in a realistic control system (complexity that might otherwise be hard coded), and it provides a method of organization that supports dynamic programming, i.e., the storage of subproblem solutions to prevent duplicate calculation. This dynamic-programming/logical-tree approach builds the W, F, and $\alpha$ parameters used in Equation 2 efficiently from user-defined XML data, allowing detailed algorithms to be constructed.

Velocity control can be used for placing end effectors as follows: the current pose of an end-effector (location and orientation for a frame end effector, for example) and the desired pose are used to construct an end-effector velocity that, if followed, will give alignment. For point end effectors, the desired velocity of the point is simply a scalar gain times the difference in position. That is, if $\bar{p}_a$ is the actual position and $\bar{p}_d$ is the desired position, then the desired velocity, $\bar{v}_d$, is given by the following, where $k_t$ is a positive gain:

$$\bar{v}_d = k_e \cdot (\bar{p}_d - \bar{p}_a). \qquad (3).$$

For frame end effectors, every three-dimensional rotation can be expressed as a rotation about a single axis. Let the unit-norm axis of rotation between the actual and desired frames be $\hat{u}$ and the angle of rotation be $\theta$. Then the desired angular velocity is given by $$\bar{\omega}_d = k_a \cdot \theta \cdot \hat{u}, \qquad (4)$$

where $k_a$ is a positive gain. This approach allows the velocity control system defined by Equation 2 to be used directly for position control.

A simulation can be scripted, with desired end-effector positions configured off line, or interactive, with the end-effector paths controllable in real time by the user through a PC mouse. A scripted simulation enables the quick creation of animations and movies for observing and conveying behavior. Interactive simulations provide hands-on understanding of robotic capabilities and provide real-time interactive demonstrations.

According to an embodiment of the present invention, a dynamic simulation can include all the capability of a kinematic simulation plus numerical integration of Newton's and Euler's dynamic equations for moving parts. Articulated dynamics, impact dynamics, and the dynamics of the motor controllers are also included.

For articulated dynamics, two methods, e.g., can be used: the Articulated Body Inertia Algorithm (e.g., see M. W. Walker and D. E. Orin, "Efficient Dynamic Computer Simulation of Robotic Mechanisms," *Journal of Dynamic Systems, Measurement, and Control*, 104, 205-211, 1982, and A. Fijany and A. K. Bejczy, "An Efficient Algorithm for Computation of Manipulator Inertia Matrix," *Journal of Robotic Systems*, 7(1), 57-80, 1990), and the Composite Rigid-Body Inertia Algorithm (e.g., see R. Featherstone, *Robot Dynamics Algorithms*, Kluwer Academic Publishers, Boston, 1987 and R. Featherstone and D. Orin, Proc. IEEE Conf. Robotics and Automation, San Francisco, Calif., 2000, pp. 826-834).

The Order(N), for N links, Articulated Body Inertia algorithm is better suited for very large robots, while the Order ($N^3$) Composite Rigid-Body Inertia algorithm is better suited for simpler robots and passive environmental objects. Both methods can be numerically integrated using a configurable algorithm that relies on predictor and corrector integration algorithms, which are ideally suited for this application (e.g., see "Numerical Integration and Digital-Model Updates in the AIM-9X Simulation," J. D. English and J. A. Bacon, Second Annual Systems Engineering Symposium, Raytheon, Waltham, Mass., June 1998).

According to an embodiment of the present invention, a parametric study can take discrete steps through changes in initial state or system parameters and tabulate simulation results. The parametric study will allow the user to easily change in fixed increments initial configurations, control parameters, surface properties, weights, lengths, end effectors, motor torques, and actuator effectiveness, and tabulate the results of those changes. Results may include (but may not be limited to) measures of sensor saturation, visibility, speed, mobility, balance, end-effector placement, and/or manipulation.

The design of the parametric study can include: 1) representation changes to the initial state and system, and 2) a representation of the results of the simulation runs. For each of these, there can be two levels of configuration, one comprehensive and one simplified.

The simplified approach can use one stated system combined with a collection of sets of changes. Each element in the collection will itself be a collection of data sets that may include 1) the manipulator index, 2) the starting link, and 3) a vector of new values for the joint variables. When the specified link is the base link, the first seven values will represent the position and orientation (through a quaternion) of the base. This is illustrated in FIG. 8*a*.

Figure 8A:
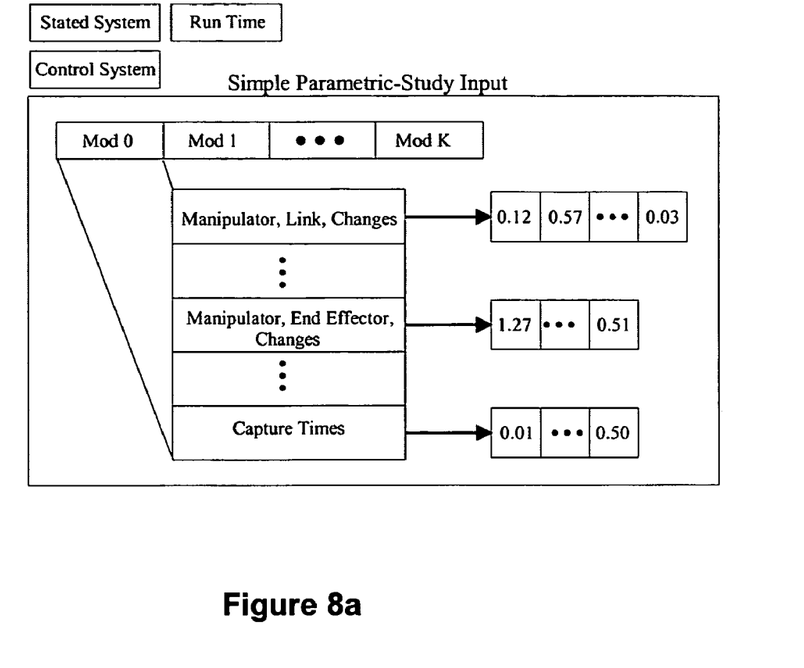
FIG. 8a is a simple form of input to the parametric study which utilizes a reference stated system, control system and run time, according to an embodiment of the present invention.

In FIG. 8*a*, the simple form of input to the parametric study uses a reference stated system, control system, and run time. It applies a vector of modifications to these reference values. Each modification is composed of multiple data sets. The first set holds state changes. The second set holds end-effector position changes. The third set is a group of capture times and the output is saved for each capture time.

Figure 8B:
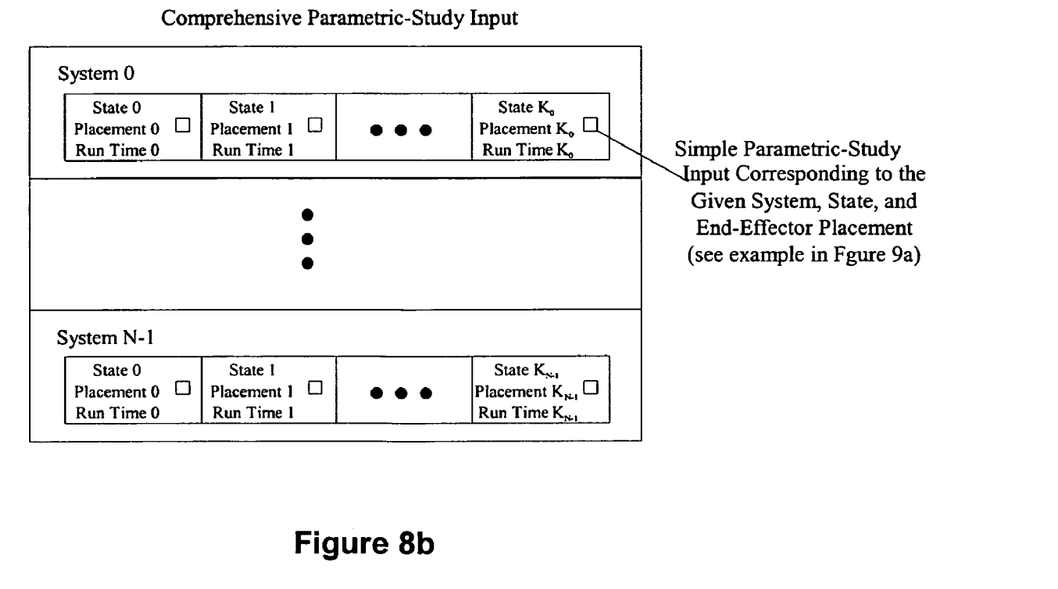
FIG. 8b is a comprehensive form of input to the parametric study which uses any number of system changes combined with any number of state, placement and run-time changes, according to an embodiment of the present invention.

The comprehensive approach to configuring a parametric study may represent each step in the study by a system, state, end-effector placement, and run time. With this, it will be possible to change at one extreme just one joint value and at the other extreme the complete system, state, and desired-positioning description. The comprehensive input to a parametric study can be organized as shown in FIG. 8*b*, wherein the comprehensive form of the input to the parametric study uses any number of system changes combined with any number of state, placement, and run-time changes. In FIG. 8*b*, each combination has a corresponding simple parametric study (matching that shown in FIG. 8*a*).

The output of each parametric study can be either a complete state or a specified subset of the state. The complete state will be comprehensive, while the subset will be a simplified form that will use less memory for storage. A subset can be specified through a vector of manipulator, starting link, end-effector, and/or number of values. This will allow any part of either the explicit state or the end-effector positions/orientations to be captured. More complex functions of the output values can be post-processed (see processing tool 20 in FIG. 1), using, for example, MATLAB, MATHEMATICA, or EXCEL.

Furthermore, according to an embodiment of the present invention, a Monte Carlo study can be performed by selecting random initial values for the system and state parameters described above for the parametric study. In addition to random initial values, noise is input to sensor and actuator models. The noise models for the sensors and actuators can be built into the classes that define them. The initial conditions for the system state can be selected based on a set of probability density functions. The selected values for a time sequence of other parameters, e.g., desired end-effector positions can also be set using probability density functions.

According to a further embodiment of the present invention, the parameter optimization study can enable the optimization of system parameters based on criteria defined through Monte Carlo studies. It can use stochastic optimization techniques, which do not require smooth, or even continuous, metrics, for optimization. This is a powerful approach built on the best tools used for analysis (Monte Carlo simulation and stochastic optimization), specifically tailored to the needs of robot designers (contrasting with more theoretical techniques, e.g., see H. Lipson, and J. B. Pollack, "Automatic Design and Manufacture of Robotic Lifeforms", *Nature* 406, 974-978, 2000). The results of a parameter optimization study can be new robotic parameters, such as length, mass motor torque, or sensor placement, which will be communicated back into the design process for review and used in the next design cycle.

Moreover, the parameter optimization study can leverage parallel processing. Algorithms and software for parameter optimization studies that can be separated, where possible, into independent pieces can either be executed in sequence on a single-core processor or in parallel on multiple processors or cores, according to an embodiment of the present invention.

Figure 9:
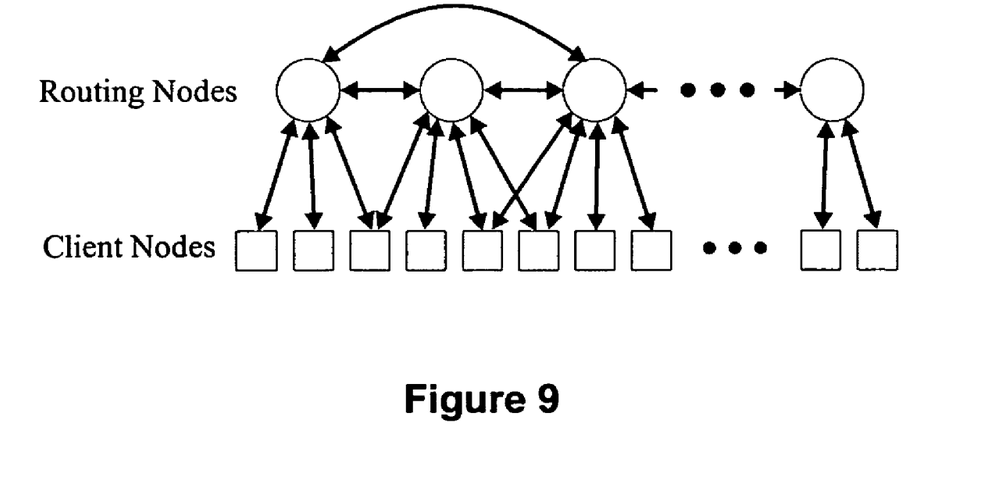
FIG. 9 is a schematic diagram of an architecture supporting peer-to-peer organization for the network implementation of embodiments of the present invention.

According to a further embodiment of the present invention, a system for network communications can be used. This system can be specifically tailored to the exchange of robotic design and validation information through the XML language, allowing for a networked validation system that is easy to use yet robust. The organization that was shown in FIG. 3 supports both client-server and peer-to-peer architectures. If there is just one routing node, it plays the role of a server. If there are multiple routing nodes, they exchange information and hand-off client interfaces to form a robust infrastructure of connections, as shown in FIG. 9, wherein the architecture supports peer-to-peer organization, with connections between clients routed through a network of routing nodes, which allows selected components to organize communication as shown in FIG. 3.

For two client nodes to exchange information, they must discover a common routing node. Over a LAN (local area network), client nodes can find server nodes using UDP (user datagram protocol) broadcast. Broadcast addresses exist at both the hardware and IP (internet protocol) level. On an IP network, broadcasts can be addressed to the four-byte IP address 255.255.255.255, allowing the message to reach every computer on a physical network (without passing through routers).

The client nodes send periodic messages seeking LAN routing nodes in this way. Each LAN routing node responds to the broadcast messages to inform the client node of its presence. After this acknowledgement, a client node can request information from the LAN routing node at any time, including identification of other LAN client nodes and of WAN (wide area network) routing nodes. For communicating information on nodes, a set of string-string, string-float, and string-integer maps can be used, described through the XML. This generic approach allows new information to be easily incorporated and consumed.

Figure 10:
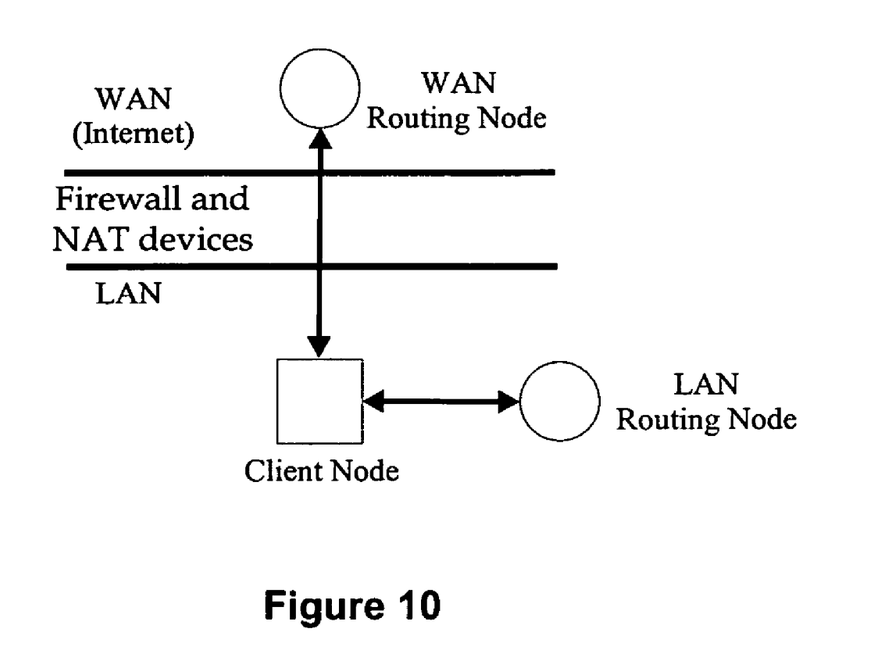
FIG. 10 is a schematic representation of a network implementation, wherein each client maintains both primary LAN routing node and a primary WAN routing node, according to an embodiment of the present invention.

Moreover, networked operation may allow interactive engineering collaboration, support engineers wanting to run validation software on fast remote computers while working on a desktop, enable interactive demonstrations to managers or other non-engineers, and support parallelization of simulation runs. To enable optimal performance in both LAN and WAN (public Internet) environments, each client can maintain contact with LAN and WAN routing nodes. The LAN routing node will be inside the most local NAT (see K. Egevang and P. Francis, "The IP Network Address Translator (NAT)", RFC 1631, IETF, May 1994) or firewall, and the WAN routing node will be outside the farthest NAT or firewall. Client nodes needing to communicate with other client nodes that are between the nearest and farthest NAT devices or firewalls can communicate in WAN mode. This is illustrated in FIG. 10, wherein each client can maintain both a primary LAN routing node and a primary WAN routing node. This allows high-performance LAN operation, while providing a firewall and NAT (Network Address Translator) friendly design for the Internet communication. The client and routing nodes will interact in the validation system as shown in FIG. 3.

Furthermore, determination of whether a client node is behind a firewall can be made using an approach related to the Simple Traversal of UDP Through NATs (STUN) protocol (see J. Rosenberg, J. Weinberger, C. Huitema, and R. Mahy, "STUN: Simple Traversal of User Datagram Protocol (UDP) through Network Address Translators (NATs)," RFC 3489, IETF, March 2003) developed by the Internet Engineering Task Force (IETF). The STUN protocol allows any STUN client to communicate with a STUN server on the public Internet to determine if it is behind a NAT and what type of NAT it is.

Figure 7:
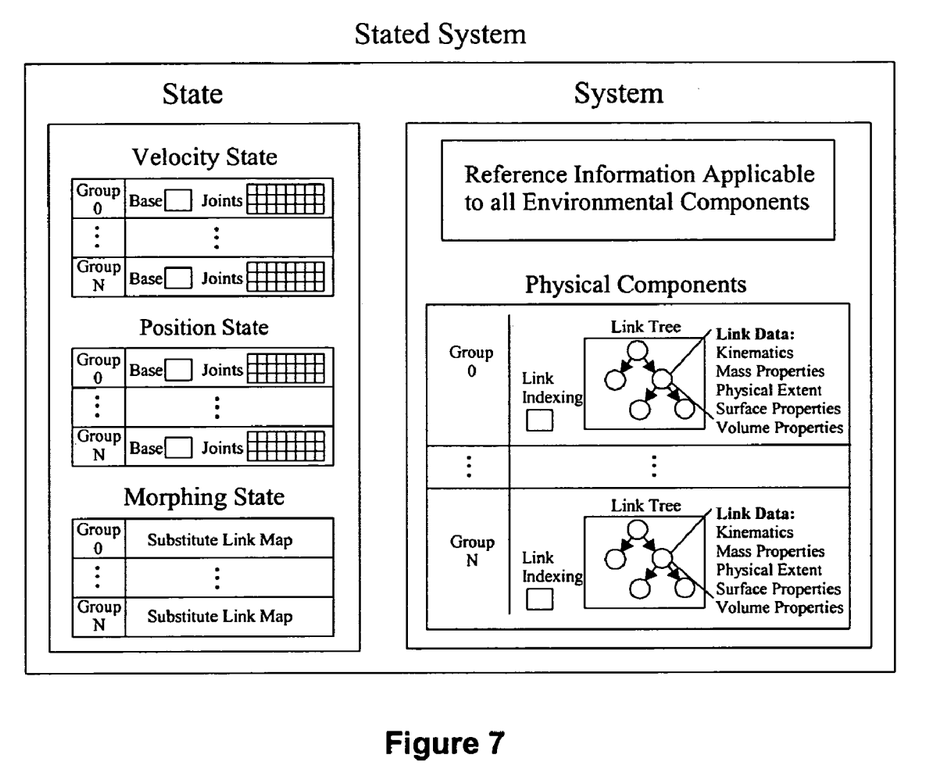
FIG. 7 is a schematic representation of a stated system as a combination of a state and a system, according to an embodiment of the present invention.
Figure 11A:
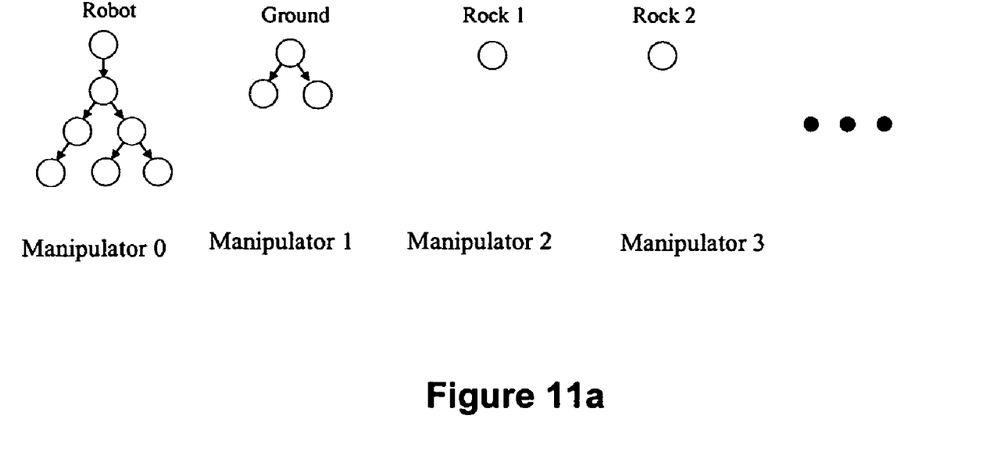
FIG. 11a is a schematic representation of a terrain simulation, according to an embodiment of the present invention.

Dynamic simulation of terrain is computationally expensive, and according to a further embodiment of the present invention, different environment configurations can be used in a variety of deformation models based on the level of fidelity required for each component. In addition to the robot, segments of terrain can be modeled as independent manipulator objects, as illustrated in FIG. 11a. Terrain features will be separated into links and shapes. The most common shape type will be a polyhedron, with each face having a unique surface property. The deformation architecture can use this approach with the FIG. 7 framework, where each link in the system can be deformed using a morphing state. In FIG. 11a, in the terrain simulation, not just the robotic mechanism, but all components of the terrain, including multiple segments of ground and independently moving rocks, will be modeled as manipulators. This will support maximum realism and optimal selection of algorithms for simulating interactions.

Figure 11B:
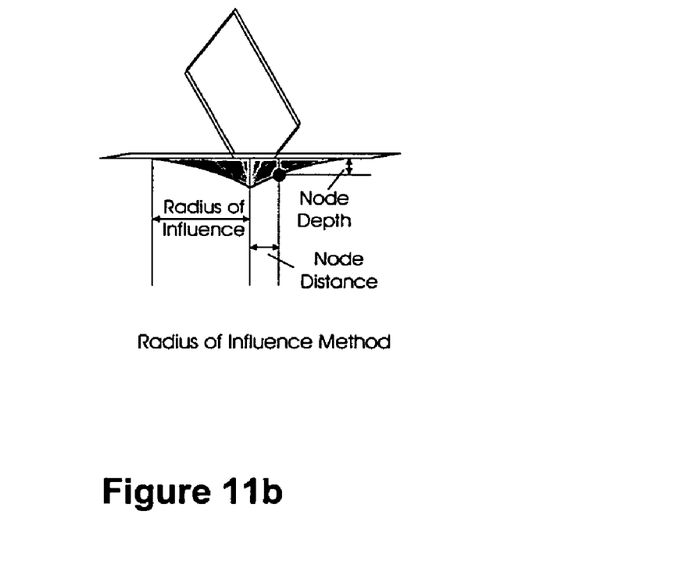
FIG. 11b is a schematic representation demonstrating the radius of influence method for terrain-robot interaction modeling, according to an embodiment of the present invention.

For example, two deformation methods for terrain-robot interaction modeling can be used. The first is the radius of influence method, which offers good runtime performance (<1 ms processor time per time step on PC hardware using a moderate mesh size) for elastic interactions. The radius of influence method is demonstrated in FIG. 11b. It works as follows: first a penetration vector is found, representing the location of an impinging foot or wheel with the ground surface. A highly connected data structure is used to find all nodes lying within the radius of influence, a configurable parameter. For each node, the depth in the direction of the penetration vector has a magnitude that is a function of the node distance from the impact center and tends toward zero for more distant nodes. This technique is well suited for simulating the flexibility of robot parts touching terrain.

The second method which can be used is the gridded compliance using a uniform surface grid, as discussed by R. W. Sumner, J. F. O'Brien, and J. K. Hodgins in "Animating Sand, Mud, and Snow," *Computer Graphics Forum*, vol. 18, no. 1, 1999. This is well suited for simulating soil interactions (e.g., with sand or stiff terrain). Each cell in the grid is treated independently, and force and movement are calculated as properties of the impinging depth and soil properties. The soil properties can be established as those described by X. Li and J. M. Moshell, in "Modeling Soil: Realtime Dynamic Models for Soil Slippage and Manipulation," *Proceedings of the 20th Annual Conf. on Comp. Graphics and Interactive Techniques*, pp. 361-368, 1993 and extended by C. Grand, F. B. Amar, P. Bidaud, and G. Andrade, in "A Simulation System for Behavior Evaluation of Off-Road Mobile Robots," *Proceedings of the CLAWAR* 2001 *Conference*, pp. 307-314, 2001.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for generating a validation system to validate a robot design of a robotic system, comprising:
    automatically converting a robot design into a generic robotic description using a predetermined format;
    automatically generating a control system from the generic robotic description; and
    updating robot design parameters of said robotic system with an analysis tool using said generic robot description and said control system;
    wherein updating the robot design parameters is performed at run time allowing for variations in motion of the robotic system.

2. The method of claim 1, wherein said robot design is loaded from robot design software.

3. The method of claim 1, wherein the robot design comprises at least one of:
    a hardware design, an electronic design, and surface properties.

4. The method of claim 1, wherein said analysis tool provide a simulation and said simulation is at least one of:
    a kinematic simulation, a dynamic simulation,
a terrain simulation.

5. The method of claim 1, wherein said predetermined format is at least one of:
an extensible markup language (XML), and
a text based format.

6. The method of claim 1, wherein said robotic description comprises at least one of:
a model of the environment, and
sensor models.

7. The method of claim 1, wherein said control system comprises at least one of:
a kinematic component,
a dynamic component,
an adaptation feature for avoiding self-collisions and collisions with the environment, and
an adaptation feature to control deforming links and avoid collisions with said deforming links.

8. The method of claim 1, wherein said robotic system comprises at least one feature out of:
one or more articulated manipulators with one or more rigid or deforming links having a fixed base,
one or more articulated mobile mechanisms with one or more rigid or deforming links,
a bifurcating kinematic structure, and
a closed kinematic structure.

9. The method of claim 1, wherein said generating the robotic validation is provided using at least one of:
network communications, and
network communications over Internet.

10. The method of claim 1, wherein said robotic system is controlled using at least one of:
network communications; and
network communications over Internet.

11. The method of claim 1, wherein said control system is established using at least one of:
network communications; and
network communications over Internet.

12. The method of claim 1, wherein said robotic system is used for at least one application out of:
space applications,
military applications,
agricultural applications,
medical applications,
domestic applications,
mining applications, and
agricultural applications.

13. The method of claim 1, wherein said updating robot design parameters comprises calculating updated robotic parameters by said analysis tool using at least one of:
Monte Carlo analysis,
parametric analysis, and
parameter-optimization analysis;
wherein the Monte Carlo analysis is performed interactively in real time and the parametric analysis is performed interactively during run time.

14. The method of claim 13, wherein said updating robot design parameters comprises using automatically said updated robotic parameters calculated by the analysis tool to improve the design of the robotic system by the design tool.

15. The method of claim 13, wherein said updated robotic parameters are provided to a design tool for improving the design of the robotic system by the design tool.

16. The method of claim 1, wherein said general robotic description comprises at least one of the following features:
shapes,
links,
manipulators,
stated systems,
mechanisms with generic joint articulation comprising sliding, rotational, elliptical, or spherical articulations, and
automatic simplification of the hardware design comprising physical dimensions, surface properties, kinematics properties or dynamics properties.

17. The method of claim 1, wherein said control system utilizes, at least in part, a Jacobian-based algorithm to control at least one of a velocity and a position of the robotic system.

18. The method of claim 17, wherein said control system is automatically generated from the generic robotic description using a velocity control framework using the following algorithm:

$$V = J(q)\dot{q}^*,$$

wherein V is an m-length vector representing a motion of end effectors; q is a vector of joint positions, q is an n-length vector formed by augmenting a derivative vector $\dot{q}$ with linear and angular velocities of a base link of said robotic system; and J is an m×n Jacobian as a function of q, wherein $$\dot{q}^* = \begin{bmatrix} J \\ N_J^T W \end{bmatrix}^{-1} \begin{bmatrix} V \\ -\alpha N_J^T F \end{bmatrix}$$

wherein $N_j$ is an n×(n−m) set of vectors that spans a null space of J, α is a scalar, W(q) is a matrix function, and F(q) is a vector function.

19. A computer program product comprising: a computer readable storage structure embodying computer program code thereon for execution by a computer processor with said computer program code, wherein said computer program code comprises instructions for performing a method comprising:
automatically converting a robot design into a generic robotic description using a predetermined format;
automatically generating a control system from the generic robotic description; and
updating robot design parameters of said robotic system with an analysis tool using said generic robot description and said control system;
wherein updating the robot design parameters is performed at run time allowing for variations in motion of the robotic system.

20. A robotic validation system for a robot design of a robotic system performed automatically, comprising: a design software interpreter, for converting the robot design into a generic robotic description using a predetermined format, and for generating a control system from the generic robotic description; and an analysis tool, for updating robot design parameters of said robotic system using said generic robot description and said control system, wherein updating the robot design parameters is performed at run time allowing for variations in motion of the robotic system.

21. The robotic validation system of claim 20, wherein said design software interpreter is a client node of a network.

22. The robotic validation system of claim 20, comprising an analysis software interpreter, for converting the generic robotic description to a native format of said analysis tool.

23. The robotic validation system of claim 22, wherein said analysis software interpreter is a client node of a network.

24. The robotic validation system of claim 20, comprising a design tool, for reading a file describing the robot design in a native format for converting said robot design to said generic robotic description using said predetermined format.

25. The robotic validation system of claim 24, comprising a post-processing tool, for writing results of said updating robot design parameters to improve the design of the robotic system by the design tool.

* * * * *